US 9,097,324 B2

(12) United States Patent
Bernardin

(10) Patent No.: US 9,097,324 B2
(45) Date of Patent: Aug. 4, 2015

(54) CONSTRUCTION ASSEMBLY FOR SPATIAL STRUCTURE WITH DRIVE SHAFT

(75) Inventor: Didier Bernardin, Paris (FR)

(73) Assignee: ASINVENT LIMITED, Hong Kong (HK)

( * ) Notice: Subject to any disclaimer, the term of this patent is extended or adjusted under 35 U.S.C. 154(b) by 115 days.

(21) Appl. No.: 13/807,389

(22) PCT Filed: Jul. 1, 2010

(86) PCT No.: PCT/IB2010/002029
§ 371 (c)(1),
(2), (4) Date: Dec. 28, 2012

(87) PCT Pub. No.: WO2012/001453
PCT Pub. Date: Jan. 5, 2012

(65) Prior Publication Data
US 2013/0098186 A1    Apr. 25, 2013

(51) Int. Cl.
*F16H 25/12* (2006.01)
*A47B 47/00* (2006.01)
*F16B 7/18* (2006.01)
*F16B 12/20* (2006.01)

(52) U.S. Cl.
CPC ............ *F16H 25/12* (2013.01); *A47B 47/0008* (2013.01); *F16B 7/185* (2013.01); *F16B 12/2063* (2013.01); *Y10T 74/18664* (2015.01)

(58) Field of Classification Search
CPC ........ F16B 7/18; F16B 7/185; F16B 12/2063; F16B 2012/40; F16B 2012/145; A47B 47/0016; F16H 25/12
USPC .............. 403/170–174, 176, 264, 217, 296, 403/DIG. 12, DIG. 13; 74/89.13; 108/158.11; 52/653.2
See application file for complete search history.

(56) References Cited

U.S. PATENT DOCUMENTS

| 3,264,019 | A | * | 8/1966 | Houvener et al. .......... 52/127.12 |
| 3,286,391 | A |   | 11/1966 | Mengeringhausen |
| 4,610,561 | A |   | 9/1986 | Cecchellero et al. |
| 4,781,644 | A | * | 11/1988 | Yoshida ......................... 446/123 |
| 4,848,952 | A | * | 7/1989 | Strassle ......................... 403/171 |
| 5,054,950 | A | * | 10/1991 | Zillgen et al. .................. 403/171 |
| 5,186,570 | A |   | 2/1993 | Graf |
| 5,238,343 | A |   | 8/1993 | Scherrer |
| 5,259,684 | A |   | 11/1993 | Scharer |

(Continued)

FOREIGN PATENT DOCUMENTS

| AT | 240751 B | 6/1965 |
| BE | 531761 A | 9/1954 |

(Continued)

*Primary Examiner* — Joshua Kennedy
(74) *Attorney, Agent, or Firm* — Hamre, Schumann, Mueller & Larson P.C.

(57) ABSTRACT

Construction assembly (1) for spatial structure comprising a support (10), a screw (50) and a drive shaft (60). The support (10) has a peripheral surface (30, 72) extends along a longitudinal direction (X). The support (10) comprises a first hole (12) extending through said peripheral surface (30) and a second hole (22) receiving the screw (50). The drive shaft (60) is pivotally mounted with respect to the support (10) along the cross axis (Y). The cross axis (Y) is not parallel to the longitudinal direction (X) and extends through the first hole (12) of the support (10), and rotation of the drive shaft (60) around the cross axis (Y) is mechanically linked to rotation of the screw (50) around the longitudinal axis (X).

20 Claims, 14 Drawing Sheets

(56) References Cited

U.S. PATENT DOCUMENTS

| | | | |
|---|---|---|---|
| 5,295,756 A * | 3/1994 | Ohta | 403/11 |
| 5,435,109 A * | 7/1995 | Kim | 52/585.1 |
| 5,498,093 A * | 3/1996 | Imai | 403/171 |
| 5,743,670 A * | 4/1998 | Ader | 403/296 |
| 6,890,121 B2 * | 5/2005 | Mauri | 403/231 |
| 7,549,819 B2 * | 6/2009 | Stauss | 403/387 |

FOREIGN PATENT DOCUMENTS

| | | |
|---|---|---|
| CA | 727498 A | 2/1966 |
| CH | 238292 A | 7/1945 |
| CH | 352814 A | 9/1954 |
| DE | 720239 C | 4/1942 |
| DE | 874657 C | 4/1953 |
| DE | 901955 C | 6/1954 |
| DE | 961389 C | 4/1957 |
| DE | 2232114 A1 | 1/1974 |
| DE | 2264697 A1 | 7/1974 |
| DE | 3115913 A1 * | 11/1982 |
| ES | 2168990 B1 | 6/2002 |
| FR | 741686 A | 2/1933 |
| FR | 899116 A | 5/1945 |
| FR | 1107422 A | 12/1955 |
| FR | 1112160 A | 3/1956 |
| FR | 1394115 A | 4/1965 |
| FR | 2803342 A1 | 7/2001 |
| GB | 1318118 A | 5/1973 |
| WO | 98/35112 A1 | 8/1998 |
| WO | 2007/116105 A1 | 10/2007 |
| WO | 2008/027021 A1 | 3/2008 |
| WO | 2008/076089 A2 | 6/2008 |
| WO | WO 2008076089 A2 * | 6/2008 |

* cited by examiner

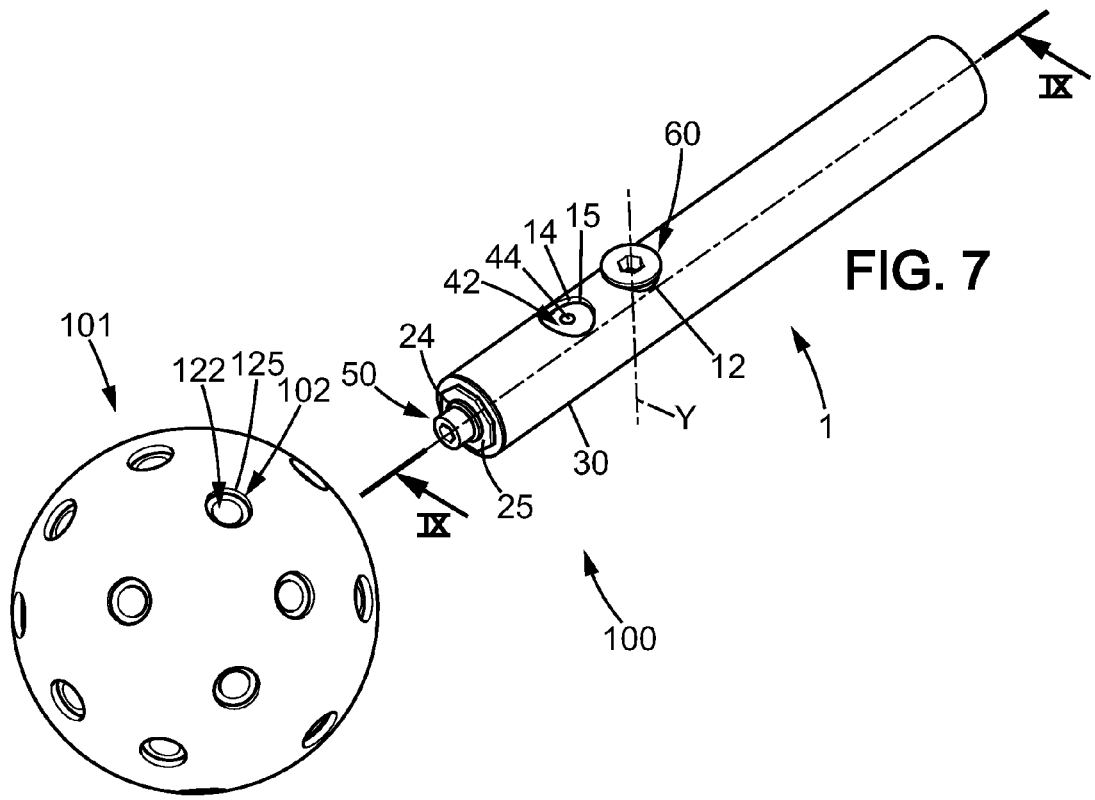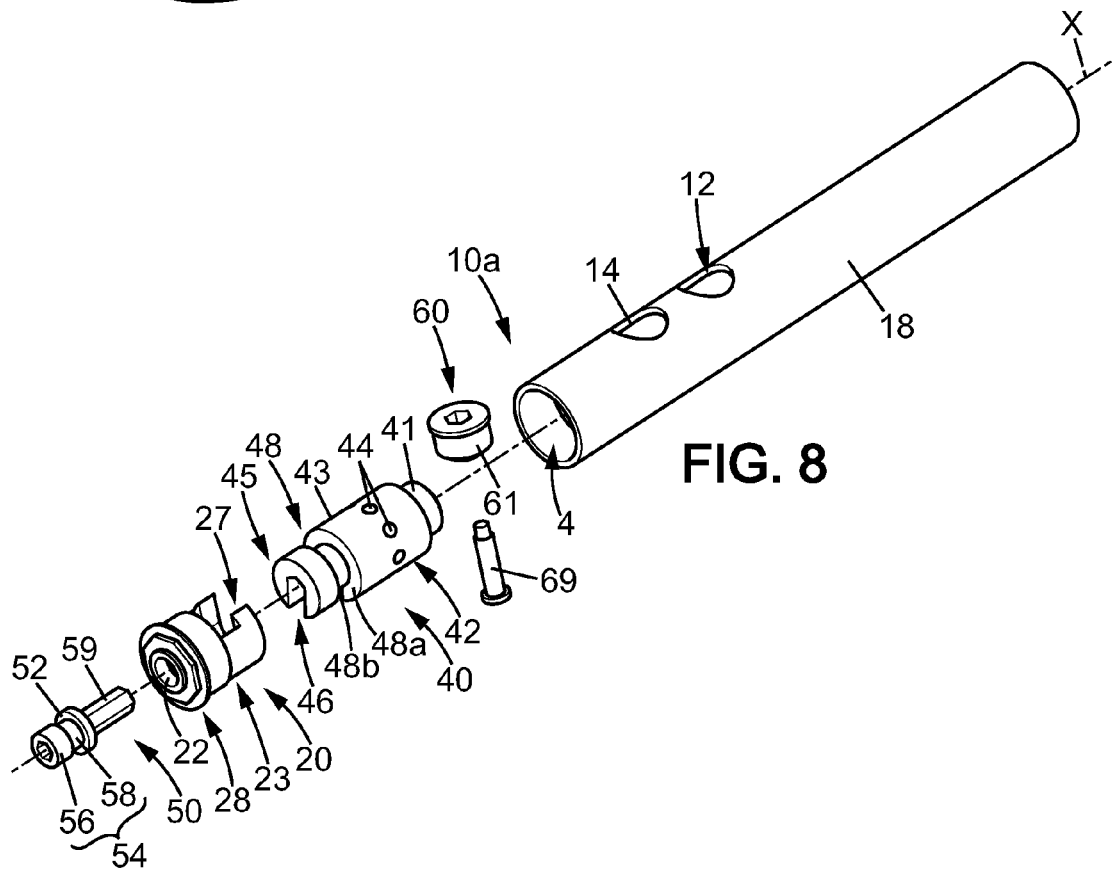

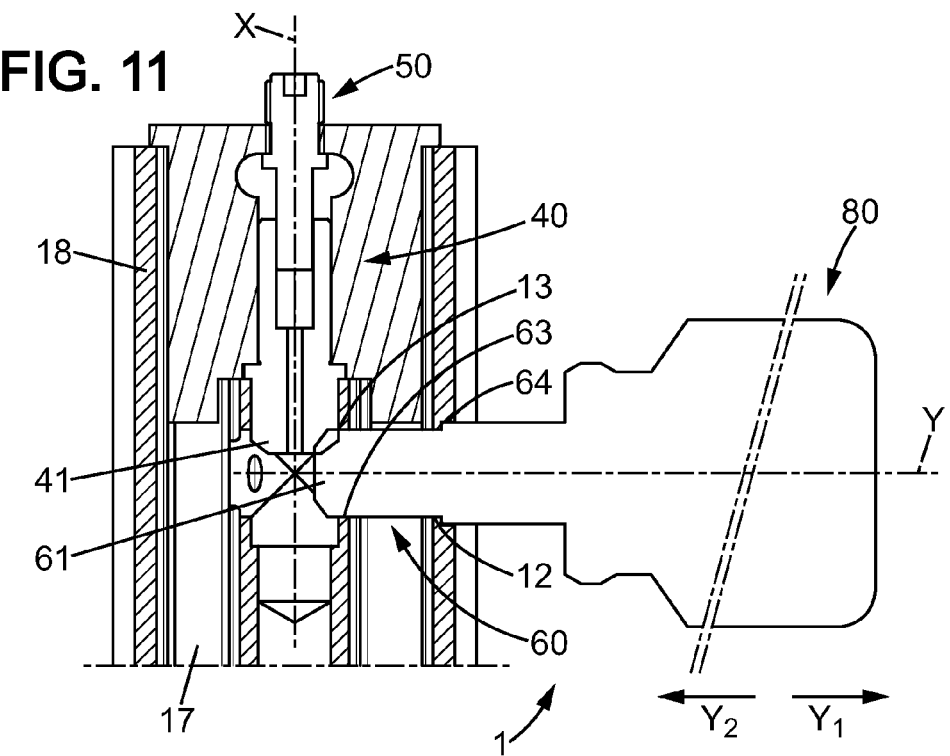
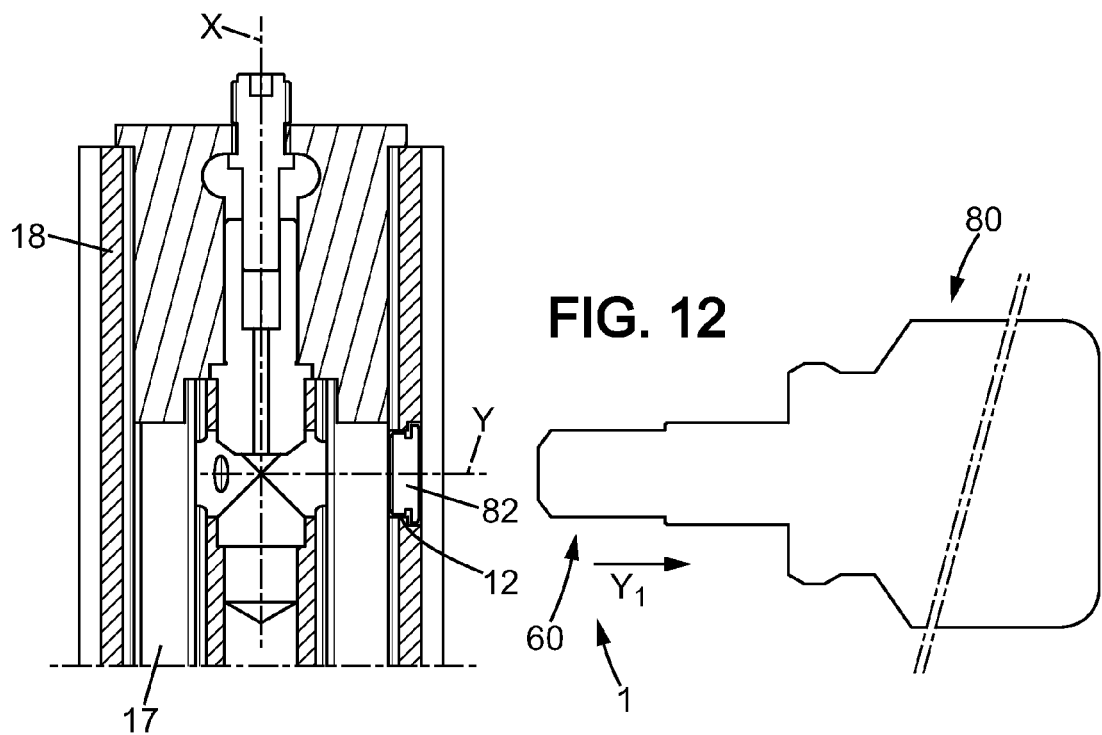

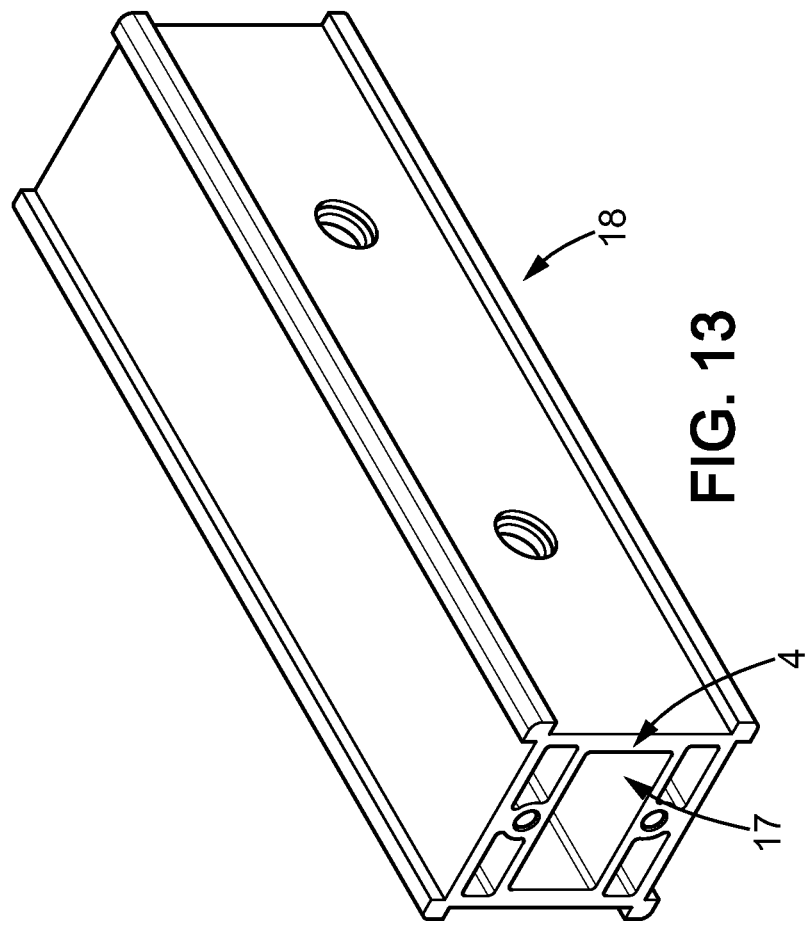
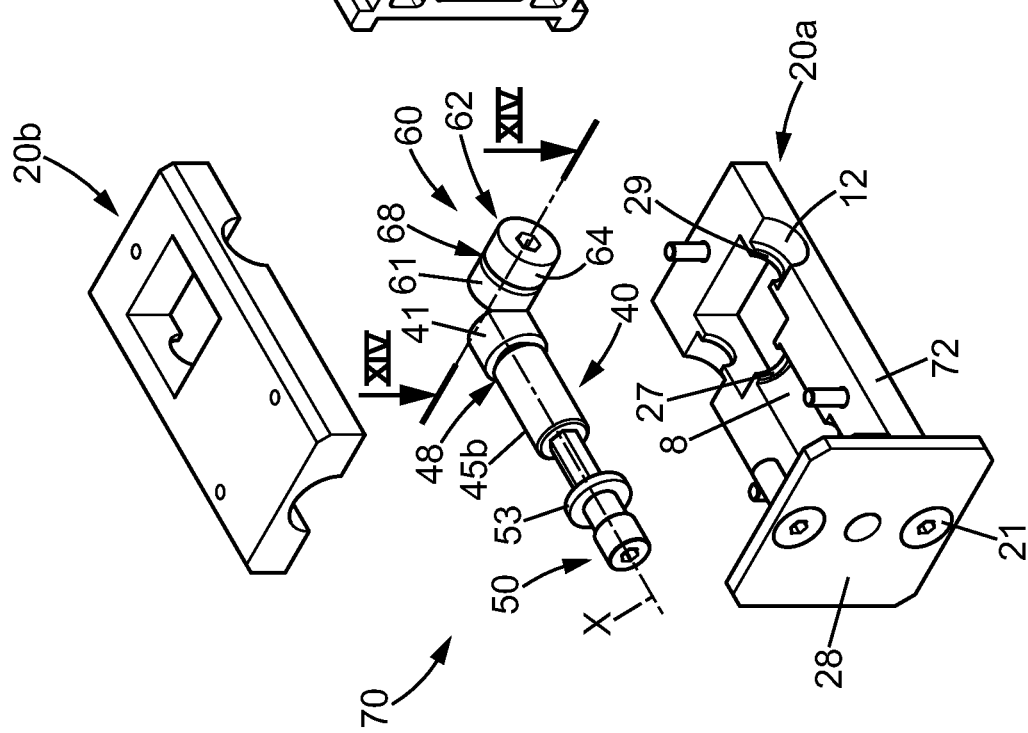
FIG. 13

CONSTRUCTION ASSEMBLY FOR SPATIAL STRUCTURE WITH DRIVE SHAFT

FIELD OF THE DISCLOSURE

The invention relates to a construction assembly for spatial structure and a device further comprising an element releasably fastened by screwing to the construction assembly.

The spatial structures that can be achieved with construction assemblies according to the invention are in particular part of furniture, architectural constructions, and machine and vehicle structures.

The invention relates in particular in the furniture field to tables, bookcases, chairs, beds, storage units, stands, and in the architectural construction field to private housings, offices, shops, stations, scaffolding.

The construction assembly is preferably part of bars, nodes, plates and parallelepiped boxes.

BACKGROUND OF THE DISCLOSURE

Document BE-531 761 discloses a construction assembly comprising a tubular rod, a sleeve and a screw. The tubular rod has an abutting surface with a hole. The sleeve has an hexagonal external section and a hole. The screw has a shank and an abutting flange. The shank extends along a longitudinal axis and includes a threaded portion. The screw is able to freely slide through the hole of the tubular rod and is able to translate without rotation around the longitudinal axis with respect to the sleeve. The user uses a spanner to drive the sleeve in rotation around the longitudinal axis. Therefore, the screw rotates around the longitudinal axis and engages a threaded hole of an element. Thus, the abutting flange of the screw abuts against the abutting surface of the tubular rod and the sleeve is interposed between the tubular rod and the element.

SUMMARY OF THE DISCLOSURE

The invention aims at providing a simple, not expensive and more robust construction assembly with a better appearance while making the spatial structure easier to build with the construction assembly.

To this goal, according to the invention the construction assembly comprises a screw, a support and a drive shaft. The screw has a shank and an abutting flange. The shank extends along a longitudinal axis and includes a threaded portion. The support has a peripheral surface extending along the longitudinal direction and an end along the longitudinal axis. The support comprises a first hole and a second hole. The first hole extends through the peripheral surface and the second hole receives the shank of the screw. The drive shaft is pivotally mounted with respect to the support along the cross axis. The cross axis is not parallel to the longitudinal direction and extends through the first hole of the support. Rotation of the drive shaft around the cross axis is mechanically linked to rotation of the screw around the longitudinal axis.

Thus, the construction assembly is simpler, has a better appearance and is more robust. Contrary to the construction assembly disclosed in BE-531 761, it does not require a sleeve intended to be interposed between the tubular rod and the element to releasably fasten by screwing the element to the construction assembly. Moreover, rotation of the drive shaft around the cross axis is generally easy to achieve for a user and can advantageously be made by a continuous movement of rotation by coupling a screw driver, a screw gun or the like to a free end of the drive shaft. To the contrary, in BE-531 761 a spanner has to be used and therefore the user has generally to achieve a back and forth motion to rotate the screw.

Preferably, in accordance with the invention, the cross axis is perpendicular to the longitudinal axis.

According to an other characteristic in accordance with the invention, and preferably, the drive shaft is prevented from translation along the cross axis in both opposite directions, so that the drive shaft can only rotate around the cross axis with respect to the support.

Thus, the drive shaft is more simply and easily driven in rotation.

According to an additional characteristic in accordance with the invention, and preferably, the drive shaft includes a head portion having a circular peripheral section around the cross axis, the first hole has a circular section, and the first hole is closed by the head portion of the drive shaft.

Thus, intrusion of dirt in the housing is reduced and the appearance of the construction assembly is improved.

According to an additional characteristic in accordance with the invention, and preferably, the head portion has an end surface along the cross axis and said end surface of the drive shaft is flush with the peripheral surface of the support.

Thus the appearance of the construction assembly is further improved.

According to another additional characteristic in accordance with the invention, and preferably, the construction assembly further comprises a guide member pivotally mounted around the longitudinal axis with respect to the support, rotation of the drive shaft around the cross axis is mechanically linked to rotation of the screw around the longitudinal axis through the guide member, the screw is free to slide along the longitudinal axis with respect to the guide member, and the screw is movable along the longitudinal axis with respect to the support.

Thus, the construction assembly can be inserted between two elements to (at least one of) which the construction assembly has to be screwed without requiring to substantially move the elements away from each other, and then to bring them closer to fix the construction assembly to the element(s).

According to an additional characteristic in accordance with the invention, the screw comprises a cylindrical pin of non-circular section, the guide member comprises a cylindrical bore receiving the cylindrical pin of the screw, and the cylindrical bore of the guide member engages the cylindrical pin of the screw to secure the guide member and the screw one to the other in rotation around the longitudinal axis.

This solution is simple and efficient.

According to an additional characteristic in accordance with the invention, and preferably, the guide member includes a tubular portion having an internal surface defined by the cylindrical bore and an external surface, and the guide member has a slot extending between the internal surface and the external surface in order to insert the cylindrical pin of the screw in the cylindrical bore of the guide member along an insertion direction perpendicular to the longitudinal axis.

This solution is simple and further simplifies manufacturing of the construction assembly.

According to another additional characteristic in accordance with the invention, and preferably, the drive shaft is coupled to the screw through bevel gearing and the guide member is prevented from translating along the longitudinal axis in one direction by the drive shaft and the drive shaft is prevented from translating along the cross axis in one direction by the guide member.

This solution efficiently link rotation of the drive shaft around the cross axis to rotation of the screw around the longitudinal axis and also retain the guide member and the drive shaft.

According to another characteristic in accordance with the invention, and preferably, the support comprises a housing and an insert, the housing has a cavity comprising an opening at an end of the support along the longitudinal axis, the insert is inserted in the cavity and fixed to the housing, the insert includes a plate comprising the second hole, and the insert includes an abutting surface cooperating with the abutting flange of the screw.

This solution simplifies manufacturing of the construction assembly and improves robustness of the construction assembly.

According to an additional characteristic in accordance with the invention, and preferably, the guide member has an abutting flange, and the insert has a guide member retaining portion abutting the abutting flange of the guide member to prevent the guide member from translating along the longitudinal axis in one direction.

This solution is simple, simplifies manufacturing of the construction assembly and efficiently retains the guide member.

According to an alternative characteristic in accordance with the invention, and preferably, the guide member has an annular groove, and the insert further comprising a guide member retaining portion engaged in the annular groove of the guide member to prevent the guide member from translating along the longitudinal axis in two opposite directions.

This solution also is simple, simplifies manufacturing of the construction assembly and efficiently retains the guide member, but in both opposite directions.

According to an additional characteristic in accordance with the invention, and preferably, the drive shaft has an abutting flange, and the insert further comprises a drive shaft retaining portion abutting the abutting flange of the drive shaft to prevent the drive shaft from translating along the cross axis in one direction.

This solution is simple, simplifies manufacturing of the construction assembly and efficiently retains the drive shaft.

According to an alternative characteristic in accordance with the invention, and preferably, the drive shaft has an annular groove, and the insert further comprises a drive shaft retaining portion engaged in the annular groove of the drive shaft to prevent the drive shaft from translating along the cross axis in two opposite directions.

This solution also is simple, simplifies manufacturing of the construction assembly and efficiently retains the guide member, but in both opposite directions.

According to another characteristic in accordance with the invention, and preferably, the insert is cast in one piece.

Thus, the robustness of the construction assembly is improved and the manufacturing is simplified by reduction of the number of parts.

According to another characteristic in accordance with the invention, and preferably, the insert defines a casing in which is retained the screw and the drive shaft, so that the insert, the screw and the drive shaft are part of a (self-supporting/unitary) module.

Thus, the manufacturing of the construction assembly is easier. Moreover housing of different sizes and identical modules are preferably produced, the modules being indifferently received within any of the housings.

According to another characteristic in accordance with the invention, and preferably, the housing is extruded.

Thus, the cost of the construction assembly is reduced.

Preferably, in accordance with the invention, the construction assembly further includes the following characteristics:
the support further has a front surface and an abutting surface, and the second hole is threaded,
the screw is movable with respect to the support in coupled translation and rotation between a retracted position and a protruding position, the threaded portion of the screw engaging the threaded hole between the retracted position and the protruding position, and the shank protruding from the front surface of the support in the protruding position, and
in a fixing position, the threaded portion of the screw protrudes from the front surface of the support, the abutting flange of the screw abuts against the abutting surface of the support, and the screw is able to rotate with respect to the support around the longitudinal axis without translating along the longitudinal axis.

Thus, the user only has to rotate the screw first to move the screw towards the element in order to engage the screw in the threaded hole of the element, and then to press the element against the construction assembly.

The invention further relates to a device comprising, in addition to the construction assembly, an element comprising a threaded fixing hole, wherein:
the construction assembly comprises an internal abutting surface and an external abutting surface,
the second hole extends through the internal abutting surface,
the screw is screwed in the fixing hole of the element,
the abutting flange of the screw abuts against the internal abutting surface of the support, and
the external abutting surface of the construction assembly exerts a pressure along the longitudinal axis against an abutting surface of the element increasing with the screwing of the screw in the fixing hole.

Thus, the fixation of the construction assembly and the element is easy to achieve and is very robust.

According to an additional characteristic in accordance with the invention, and preferably, the construction assembly comprises a crank having a non-circular cross section perpendicular to the longitudinal axis, and the element comprises a crank opposite and complementary to the crank of the construction assembly, so that the construction assembly and the element fit into each other.

Thus, the fixation between the construction assembly and the element is more rigid and more robust.

According to an additional characteristic in accordance with the invention, and preferably, the crank of the construction assembly and the crank of the element have a polygonal cross section perpendicular to the longitudinal axis.

Preferably, in accordance with the invention, one of the cranks of the construction assembly and the crank of the element has a regular octagonal cross section perpendicular to the longitudinal axis.

BRIEF DESCRIPTION OF THE DRAWINGS

Other features and advantages of the present invention will appear in the following detailed description, with reference to the appended drawing in which:

FIG. 7 shows in perspective a device according to a second embodiment, FIG. 8 shows the construction element according to the second embodiment in exploded perspective, FIG. 11 shows partially, in cross section, the construction element according to a third embodiment, a driver being inserted, FIG. 12 shows the third embodiment in accordance with FIG. 11, the driver being removed, FIG. 13 shows in perspective, partially exploded, a device according to a fourth embodiment.

DETAILED DESCRIPTION

Figure 1:
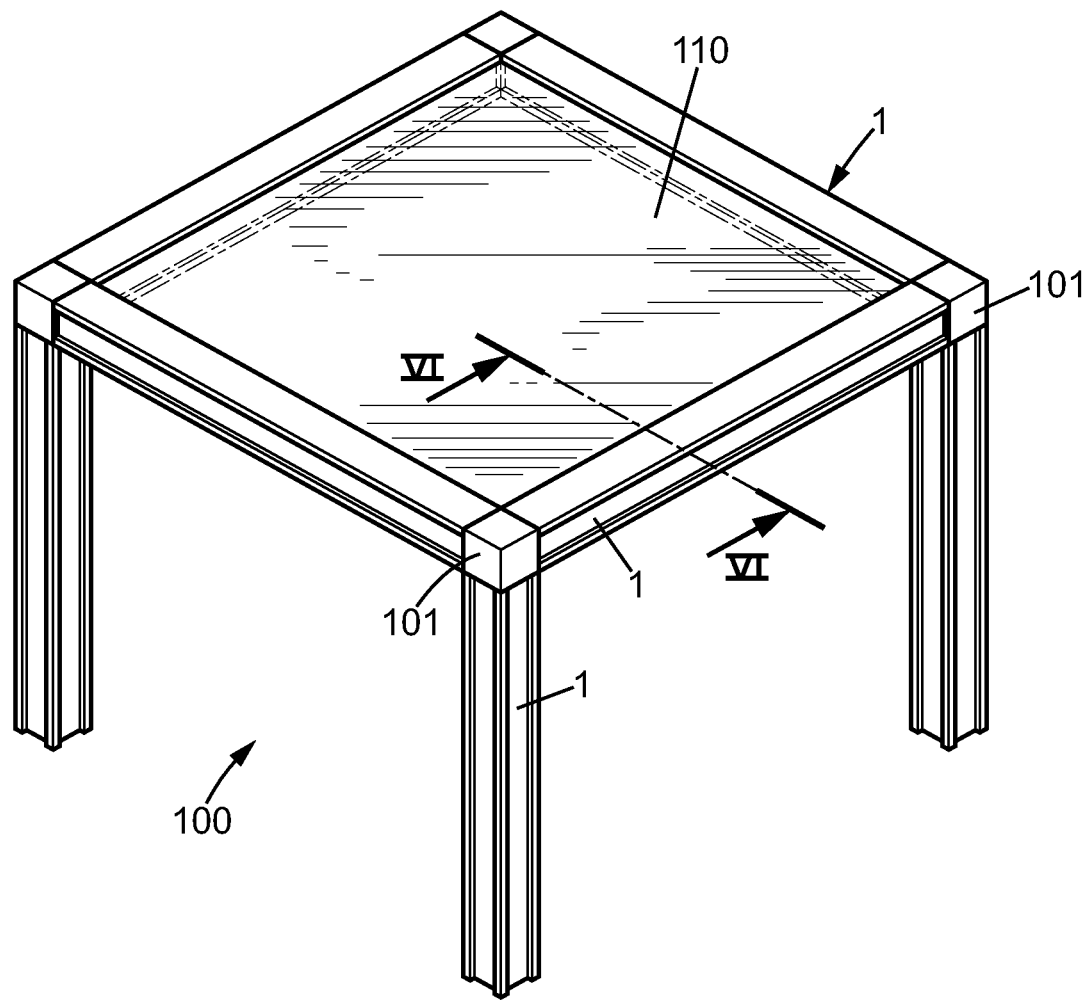
FIG. 1 schematically shows in perspective a device according to the invention comprising a plurality of construction elements and joining elements fastened ones to the others.

FIG. 1 shows a device 100 forming a spatial structure made of construction elements 1 and joining elements 101 fastened ones to the others.

In the embodiment illustrated, all the construction elements 1 are identical and all the joining elements 101 are identical. Each construction element 1 has an external shape of a bar having a substantially constant external section and extending along a longitudinal axis X. Each joining element 101 defines a node having an external shape of a cube having a threaded fixing hole 122 in the middle of each face.

In the embodiment shown in FIG. 1, the device 100 further includes a plate 110. The device 100 defines a table. The construction elements 1 constitute the feet and the peripheral edge of the table. The joining elements 101 constitute the corners of the table. The plate 110 constitutes the top of the table.

Figure 2:
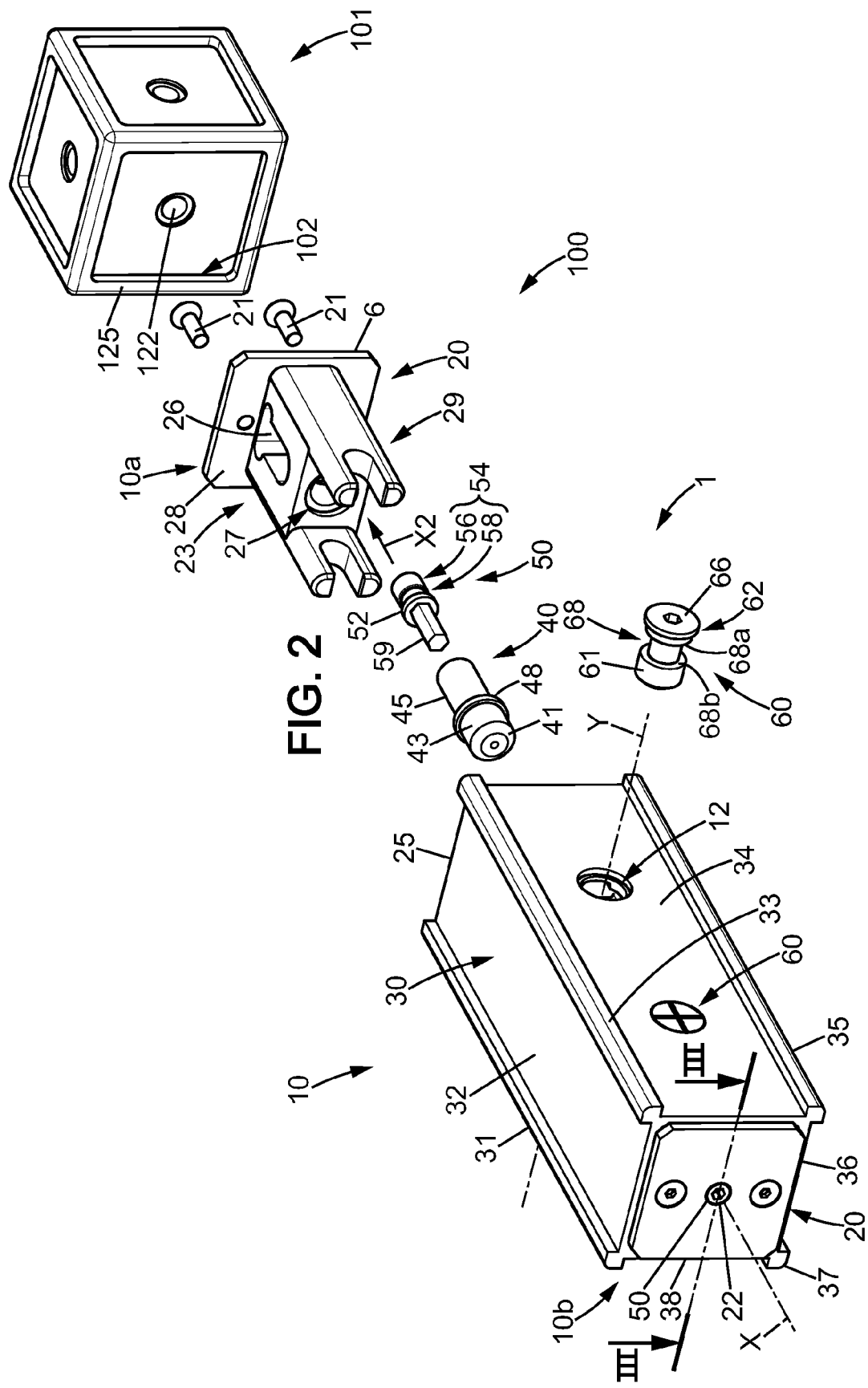
FIG. 2 shows in perspective, partially exploded, and at an enlarged scale a construction element and a joining element of the device, according to a first embodiment.
Figure 3:
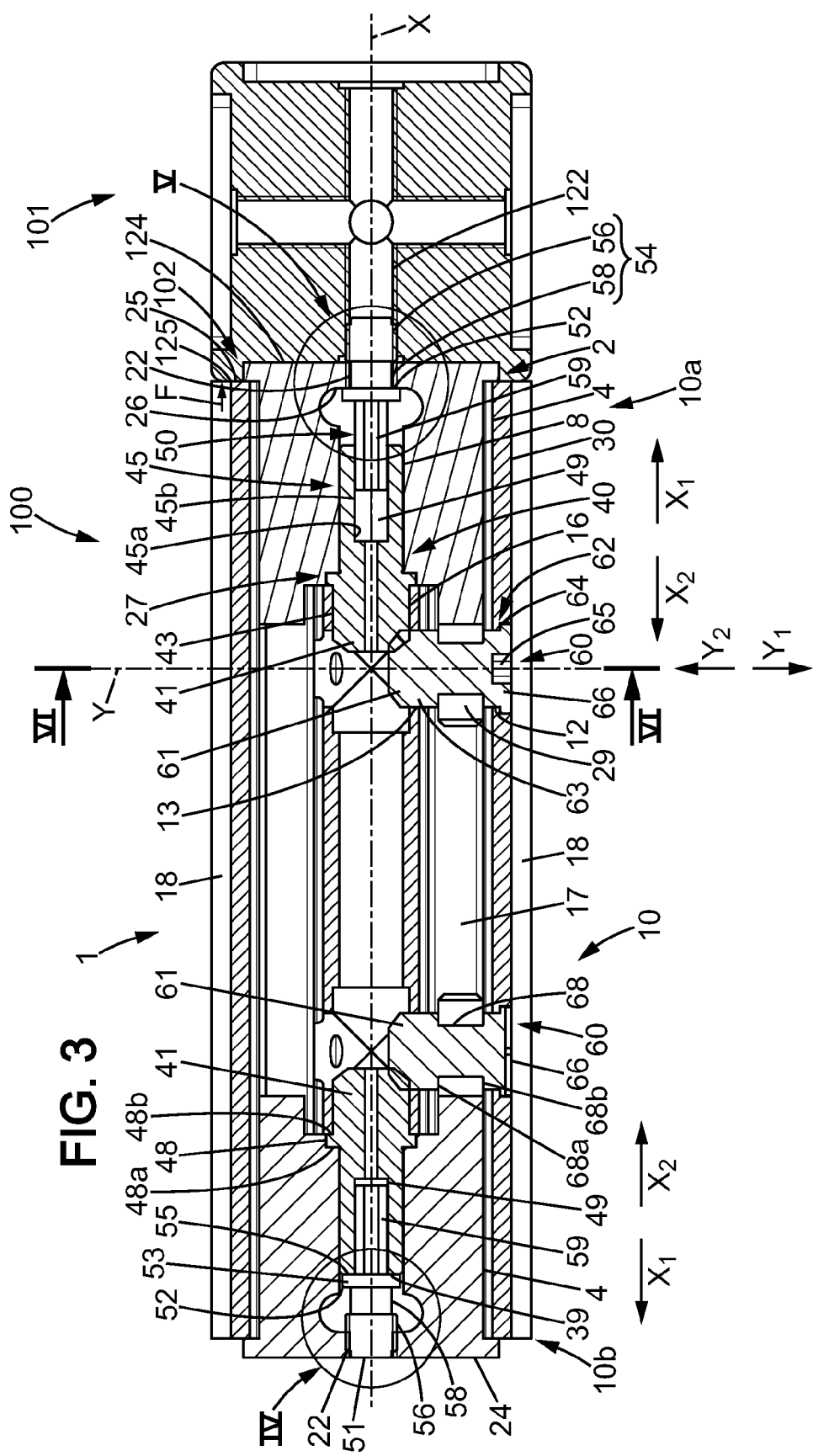
FIG. 3 is a cross section view on line referenced III-III in FIG. 2.

As shown in particular in FIGS. 2 and 3, the construction element 1 comprises a support 10 and a screw 50 movable with respect to the support 10 in order to be screwed in one threaded fixing hole 122 of the joining element 101. The construction element 1 further comprises a guide member 40 and a drive shaft 60.

The support 10 extends along the longitudinal axis X between a first end 10a and a second end 10b. The support 10 includes a housing 18 and an insert 20. The housing 18 has a peripheral surface 30 which is cylindrical and extends along the longitudinal axis X. The housing 18 further has a cavity 17 having an opening 4 at each end 10a, 10b. The insert 20 is inserted in the cavity of the housing 18 through the opening 4 at the first end 10a and another (identical) insert 20 at the second end 10b. In the embodiment shown in FIGS. 1 to 6, the housing 18 is a bar having a tubular shape with longitudinal reinforcing ribs and is extruded so that it has substantially the same cross section along the longitudinal axis X. Moreover, the first end 10a and the second end 10b of the construction element 1 are identical. Parts at the first end 10a and parts at the second end 10b being identical have the same reference number.

In the embodiment shown in FIGS. 2 to 6, the insert 20 comprises a body 23 and a plate 28 integral with the body 23. The insert 20 is preferably cast in one piece. The plate 28 comprises an internal abutting surface 26 and a front surface 24 opposite to the internal abutting surface 26. Both of the front surface 24 and the internal abutting surface 26 are plane and extend perpendicular to the longitudinal axis X of the construction element 1. The plate 28 has passages receiving screws 21, so that the plate 28 is fixed to the housing 18 by the screws 21. The plate 28 further has a threaded hole 22 extending between the internal abutting surface 26 and the front surface 24 along the longitudinal axis X.

The screw 50 extends along the longitudinal axis and has a shank 54, a cylindrical pin 59 and a ledge 53 disposed between the shank 54 and the cylindrical pin 59. The shank 54 includes a threaded portion 56 and an annular groove 58, smooth (not threaded), disposed between the threaded portion 58 and the ledge 53. So, the threaded portion 56 extends along the longitudinal axis X and in a first direction X1 from the groove 58 up to an end surface 51 of the screw 50.

Figure 4A:
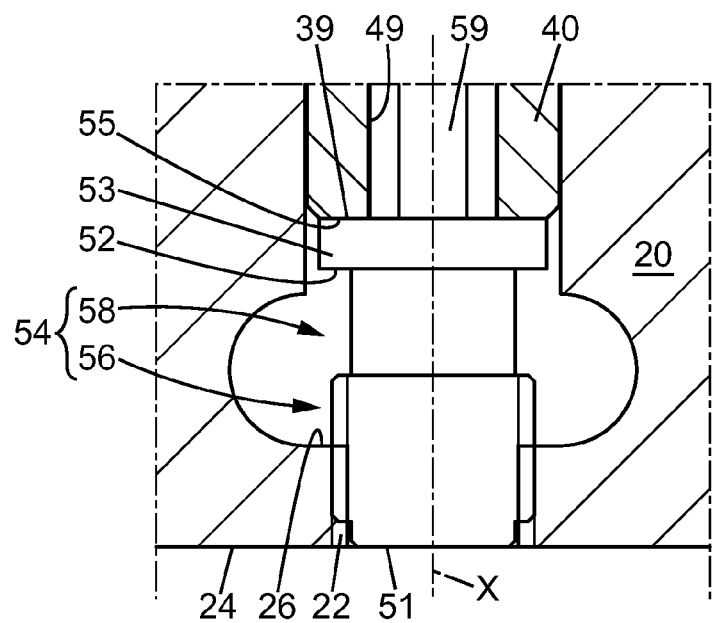
FIG. 4A is a view at an enlarged scale of the area referenced IV in FIG. 3, showing the screw in a retracted position.
Figure 4B:
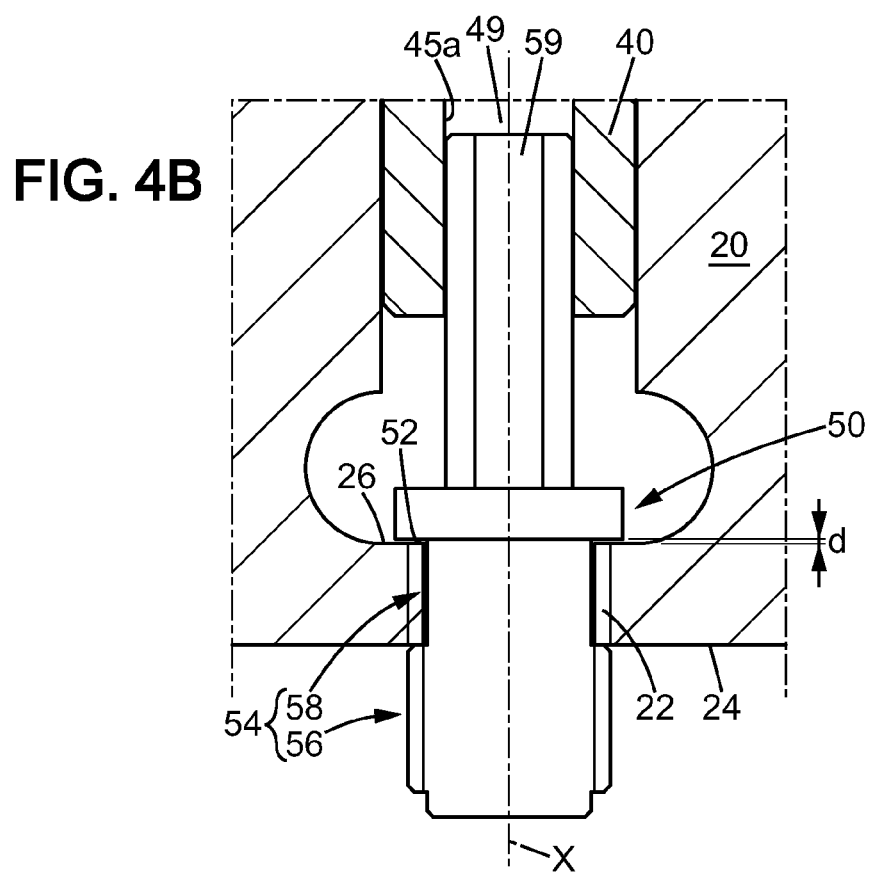
FIG. 4B is a view similar to FIG. 4A, showing the screw in a protruding position.

The screw 50 engages the threaded hole 22 of the insert 20 between a retracted position, shown in particular in FIG. 4A and a protruding position shown in FIG. 4B. Therefore, the screw 50 is linked in coupled translation and rotation along the longitudinal axis X with respect to the support 10 between the retracted position and the protruding position.

The ledge 53 has a retaining flange 55 and an abutting flange 52. In the retracted position, the end surface 51 of the screw 50 is flush with the front surface 24, the threaded portion 56 of the screw 50 engages the threaded hole 22 and the retaining flange 55 abuts against an end abutting surface 39 of the guide member 40. Therefore, translation of the screw 50 in a second direction X2, opposite to the first direction X1, along the longitudinal axis X due to unscrewing of the screw 50 is stopped in the retracted position, thereby preventing the disengagement of the screw 50 from the threaded hole 22.

The engagement of the threaded portion 56 in the threaded hole 22 ends in the protruding position shown in FIG. 4B. Between the protruding position and the fixing position shown in FIG. 5, the annular groove 58 is in the threaded hole 22, the threaded portion 56 does not engage the threaded hole 22, and therefore the screw 50 can independently rotate around the longitudinal axis X and translate along the longitudinal X.

As shown in particular in FIG. 4B, in the protruding position, the abutting flange 52 is at a distance d from the internal abutting surface 26 of the insert 20. Advantageously, the distance d is less than 10% and preferably less than 5% of the diameter of the threaded hole 22. Moreover, the distance d is advantageously less than 3 millimetres and preferably less than 1 millimetre.

Figure 5:
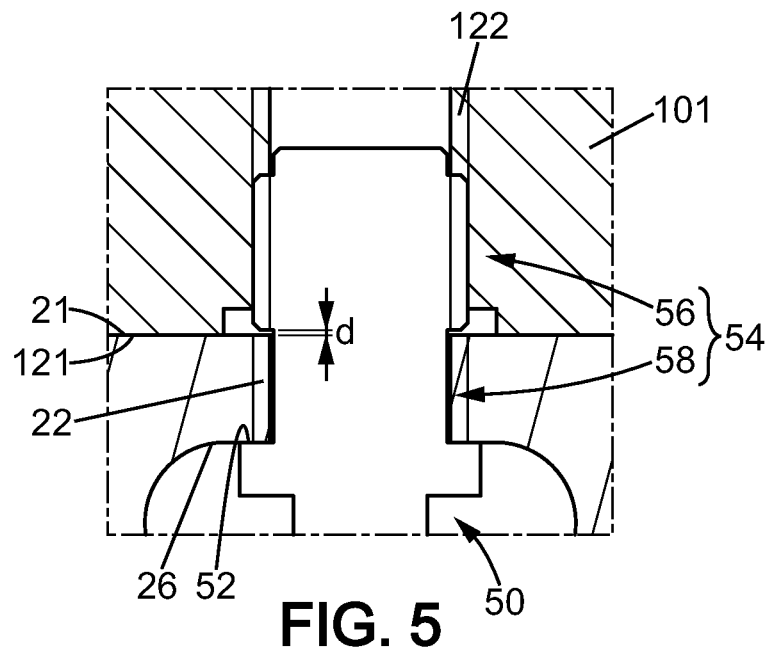
FIG. 5 is a view at an enlarged scale of the area referenced V in FIG. 3, showing the screw in a fixing position

As shown in particular in FIG. 5, in the fixing position, the abutting surface 52 of the screw 50 abuts against the internal abutting surface 26 of the insert 20 and a gap d exists between the threaded portion 56 of the screw 50 and the threaded hole 22.

So, rotating the screw 50 in a first rotating direction from the retracted position enables to make the threaded portion 56 of the screw 50 protrudes. Thus, if the joining element 101 faces one of the ends 10a, 10b, the threaded portion 56 of the screw 50 engages the fixing hole 122 of the joining element 101 due to rotation of the screw 50 in said first rotating direction. The screw 50 moves in coupled translation and rotation along the longitudinal axis X with respect to the support 10 from the retracted position up to the protruding position. Then, since the threaded portion 56 of the screw 50 still engages the fixing hole 122 of the joining element 101, but does not engages anymore the threaded hole 22 of the construction element 1, keeping on rotating the screw 50 in the first direction moves the joining element 101 towards the construction element 1.

In the fixing position, shown in particular in FIGS. 3 and 5, an external abutting surface 25 of the support 10 is in contact against an abutting surface 125 of the joining element 101. Then, function of the rotation of the screw 50 with respect to the support 10 in the first rotation direction around the longitudinal axis X, and therefore function of the screwing (coupled translation and rotation of the screw 50 in the fixing hole 122), the retaining flange 52 exerts an increasing pressure against the internal abutting surface 26 and thus the external abutting surface 25 exerts an increasing pressure F against the abutting surface 125 of the joining element 101.

In the embodiment shown in FIGS. 2 to 5, the plate 28 has a peripheral surface 6 having a cross section perpendicular to the longitudinal axis X which is substantially square. The external abutting surface 25 is plane and is part of the housing 18. The plate 28 protrudes from the external abutting surface 25. Therefore, the construction element 1 has at each end 10a, 10b a protruding crank 2 having a non-circular (square) section perpendicular to the longitudinal axis X.

The joining element 101 has a front surface 124 which is set back to the abutting surface 125 and faces the front surface 24 of the construction element 1. So, the joining element 101 has a set back crank 102 of substantially cross section perpendicular to the longitudinal axis X which is complementary to the protruding crank 2 of the construction element 1. Thus, the construction element 1 and the joining element 101 fit into each other. Therefore, the construction element 1 is indexed in one of four angular relative positions with respect to the joining element 101 around the longitudinal axis X.

The guide member 40 comprises the end surface 39 at an end of the guide member 40 in the first direction X1, along the longitudinal axis X and a conical gear 41 at an opposite end of the guide member along the longitudinal axis X in the second direction X2.

The guide member 40 further comprises a tubular portion 45 having an internal surface 45a and an external surface 45b. The internal surface 45a defines a cylindrical bore 49 within which the cylindrical pin 59 of the screw is received.

The cylindrical pin 59 is free to slide along the longitudinal axis X with respect to the guide member 40 between the fixing position and the retracted position. As mentioned above, the screw 50 is prevented from sliding in the second direction X2 with respect to the support 10 along the longitudinal axis X beyond the retracted position by abutment of the retaining flange 55 of the screw 50 against the end abutting surface 39 of the guide member 40. The cylindrical pin 59 has a hexagonal external cross-section which is similar and complementary to the cross internal section of the bore 49. Therefore, the bore 49 engages the cylindrical pin 59 of the crew so that they are linked in rotation around the longitudinal axis X.

The body 23 of the insert 20 further comprises a bore 8, cylindrical of circular cross section, extending around and along the longitudinal axis X and facing the external surface 45b. Both of the bore 8 and the external surface 45b have a circular cross section. The bore 8 of the insert 20 forms a bearing surface against which rotates the external surface 45b of the guide member 40 around the longitudinal axis X.

Moreover, the housing 18 comprises a cylindrical surface 16 of circular cross section extending around and along the longitudinal axis X. The cylindrical surface 16 of the housing 18 forms a bearing surface against which rotates an annular external surface 43 of the guide member 40. The annular external surface 43 is near the conical gear 41.

The guide member 40 further comprises a ledge 48, having a first abutting flange 48a and a second abutting flange 48b. The first abutting flange 48a faces a guide member retaining portion 27 of the body 23 of the insert 20. The guide member retaining portion 27 of the insert 20 has an abutting surface preventing, by abutting the first abutting flange 48a, the guide member 40 from translating in the first direction X1 along the longitudinal direction axis X with respect to the support 10. The second abutting flange 48b faces an end of the cylindrical surface 16 of the housing 18 which thereby optionally prevents, by abutting the second abutting flange 48b, the guide member from translating in the second direction X2 along the longitudinal direction axis X with respect to the support 10.

The drive shaft 60 extends along a cross axis Y which is not parallel to the longitudinal axis X. In the embodiment shown in FIGS. 1 to 6, the cross axis Y is perpendicular to the longitudinal axis X.

The drive shaft 60 comprises a head 62 at an end in a first direction Y1 along the cross axis Y and a conical gear 61 engaging the conical gear 41 of the guide member 40 at an opposite end of the drive shaft 60 along the cross axis Y in a second direction Y2 opposite to the first direction Y1.

The head 62 has, around the cross axis Y, a circular peripheral section 64 which is received within a side hole 12. The side hole 62 extends along the cross axis Y and through the peripheral surface 30. The side hole 12 has a circular section perpendicular to the cross axis Y and forms a bearing surface against which rotates the peripheral portion 64 of the head 62 of the drive shaft 60. Since the section of the side hole 12 is close to the section of the head 62 of the drive shaft 60, the head 62 of the drive shaft 60 closes the side hole 12.

The drive shaft 60 further comprises an annular external surface 63 near the conical gear 61. The external surface 63 is received within a bore of circular cross section achieved in the housing 18 and forming a bearing surface 13 against which rotates the external surface 63 of the drive shaft 60.

Therefore, the side hole 12 and the bearing surface of the support 10 guide the drive shaft 60 along the cross axis Y.

The drive shaft 60 further has an annular grove 68 having a first abutting surface 68a and a second abutting surface 68b. The body 23 of the insert 20 further has a drive shaft retaining portion 29. The drive shaft retaining portion 29 of the insert 20 has a fork shape and engages the annular groove 68. Said drive shaft retaining portion comprises to fingers extending along the longitudinal axis X, in the annular groove 68 and between which the drive shaft 60 is received. So, both of the first abutting flange 68a and the second abutting flange 68b faces the drive shaft retaining portion 29 of the insert 20. Therefore, the drive shaft retaining portion 29 prevents, by abutting against the first abutting flange 68a, the drive shaft 60 from translating along the cross axis Y in the first direction Y1. And, the drive shaft retaining portion 29 prevents, by abutting against the second abutting flange 68b, the drive shaft 60 from translating along the cross axis Y in the second direction Y2, with respect to the support 10.

Consequently, the drive shaft 60 can only rotate around the cross axis Y with respect to the support 10.

The guide member 40 is further prevented from translating along the longitudinal axis X in the second direction X2 since the conical gear 61 of the drive shaft 60 engages the conical gear 41 of the guide member 40 and the drive shaft 60 is prevented from translating along the cross axis Y in the second direction Y2 by the conical gear of the guide member 40. Therefore, the guide member retaining portion 27 of the insert 20 could prevent the guide member 40 from translating along the longitudinal direction axis X only in the first direction X1 and the drive shaft retaining portion 29 could only prevent the drive shaft 60 from translating along the cross axis Y only in the first direction Y1, with respect to the support 10. But, the robustness and the easiness of manufacturing the construction element would be reduced.

Otherwise, the head portion 62 of the drive shaft has an end surface 66 along the cross axis Y in the first direction Y1, and said end surface 66 of the drive shaft 60 is flush with the peripheral surface 30 of the support 10.

A hollow of hexagonal section defines a tool receiving portion 65 intended to receive a hex key and facing out from the housing 18.

Since the conical gear 61 of the drive shaft 60 engages the conical 41 of the guide member, and the guide member 40 is linked in rotation to screw through engagement of the bore 49 and the pin 59, rotation of the drive shaft 60 around the cross axis Y is mechanically linked to the rotation of the screw 50 around the longitudinal axis X.

Therefore, fastening of the construction element 1 with the joining element 101 is very easy, since the user can easily continuously rotate a hex key inserted in the tool receiving portion 65 of the drive shaft 60.

Figure 6:
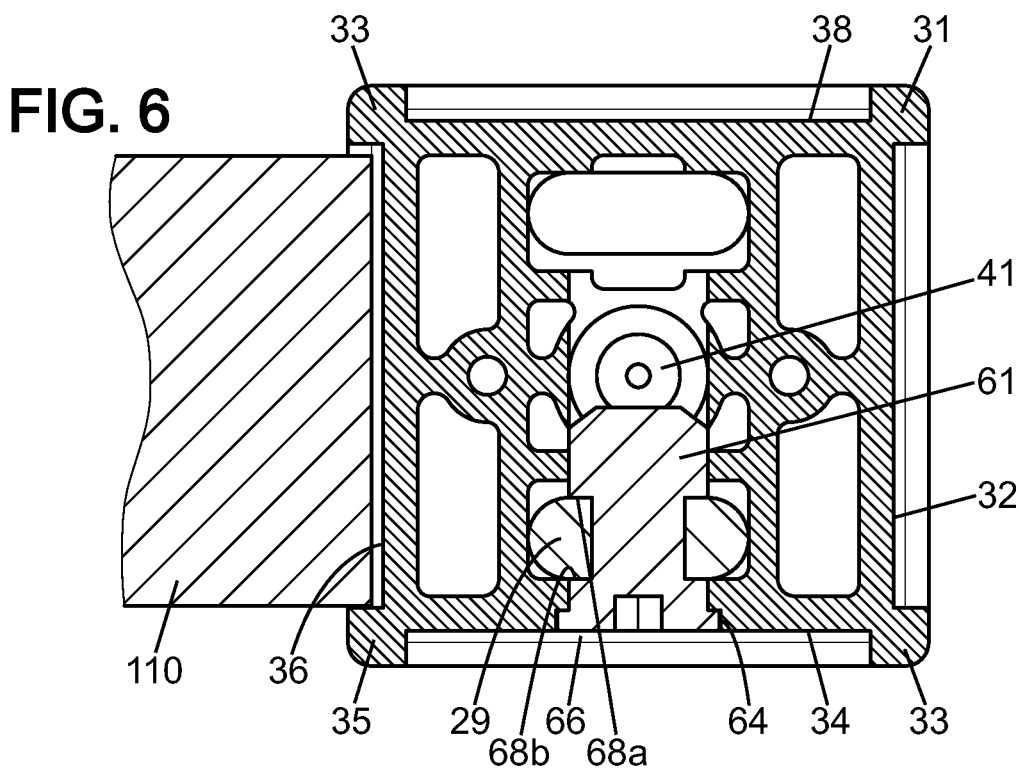
FIG. 6 is a partial cross section view on line referenced VI-VI in FIG. 1, at an enlarged scale.

As shown in particular in FIG. 6, the housing 18 has four external flat lateral surfaces 32, 34, 36, 38 and four ribs 31 defining the peripheral surface 30.

The lateral surfaces 32, 34, 36, 38 and the ribs 31, 33, 35, 37 extend along the longitudinal axis X. Each rib 31, 33, 35, 37 joins two adjacent lateral surface 32, 34, 36, 38 and protrudes from both of the adjacent lateral surfaces.

Therefore, the plate 110 of the table is easily maintained between two ribs 33, 35 of four construction elements 1 surrounding the plate 110.

In FIG. 6, the tool receiving portion 65 of the drive shaft 60 preferably faces the floor to hide the drive shaft 60.

The screw 50 further has an optional tool receiving portion intended to receive a hex key in the end surface 51, as shown in FIG. 2. But, generally only the tool receiving portion 65 of the drive shaft 60 is accessible.

In order to manufacture the construction element, the drive shaft 60 is inserted in the housing 18 through the side hole 12, the pin 59 of the screw 50 is inserted in the bore 49 of the guide member 40, the tubular portion 45 of the guide member 40 is inserted in the bore 8 of the insert 20 and the screw is screwed in the threaded hole 22. Then, the insert 20 is inserted into the cavity 17 through the opening 4, the annular external surface 43 of the guide member 40 facing the cylindrical surface 16 of the housing and the drive shaft retaining portion 29 engaging the annular grove 68 of the drive shaft 60. And, the insert 20 is fixed to the housing by the screws 21.

FIGS. 7 to 10 show a second embodiment of device 100 in accordance with the invention.

In the embodiment shown in FIGS. 7 to 10, the housing 18 includes the cylindrical surface 16 forming bearing surface against which rotates the annular external surface 43 of the guide member 40. Therefore, the peripheral surface (cylindrical surface 16) defining the cavity 17 of the housing 18 is of circular section.

Moreover, the insert 20 does prevent the drive shaft 60 from translating along the cross axis Y anymore. Instead of the drive shaft retaining portion 29 of the insert of the embodiment shown in FIGS. 1 to 6, in the embodiment shown in FIGS. 7 to 10, the drive shaft 60 is prevented from translating, along the cross axis Y in the first direction Y1, by a retaining screw 69. The head 62 has a collar 67 abutting against the peripheral surface 30 of the housing 18 and therefore preventing the drive shaft 60 from translating along the cross axis Y in the second direction Y2.

Moreover, the guide member 40 has a groove 48 having a first abutting surface 48a and a second abutting surface 48b. The guide member retaining portion 27 of the insert 20 has a fork shape extending perpendicularly to the longitudinal axis X and engaging the annular groove 48. The guide member retaining portion 27 comprises to fingers extending in the annular groove 48 and between which the guide member 40 is received. So, both of the first abutting flange 48a and the second abutting flange 48b faces abutting surfaces 27a, 27b of the guide member retaining portion 27 of the insert 20. Therefore, the guide member retaining portion 27 prevents, by abutting the abutting flange 48a, the guide member 40 from translating along the longitudinal axis X in the first direction X1, and the guide member retaining portion 27 prevents, by abutting the abutting second flange 48b, the guide member 48 from translating along the longitudinal axis X in the second direction X2, with respect to the support 10.

Figure 10:
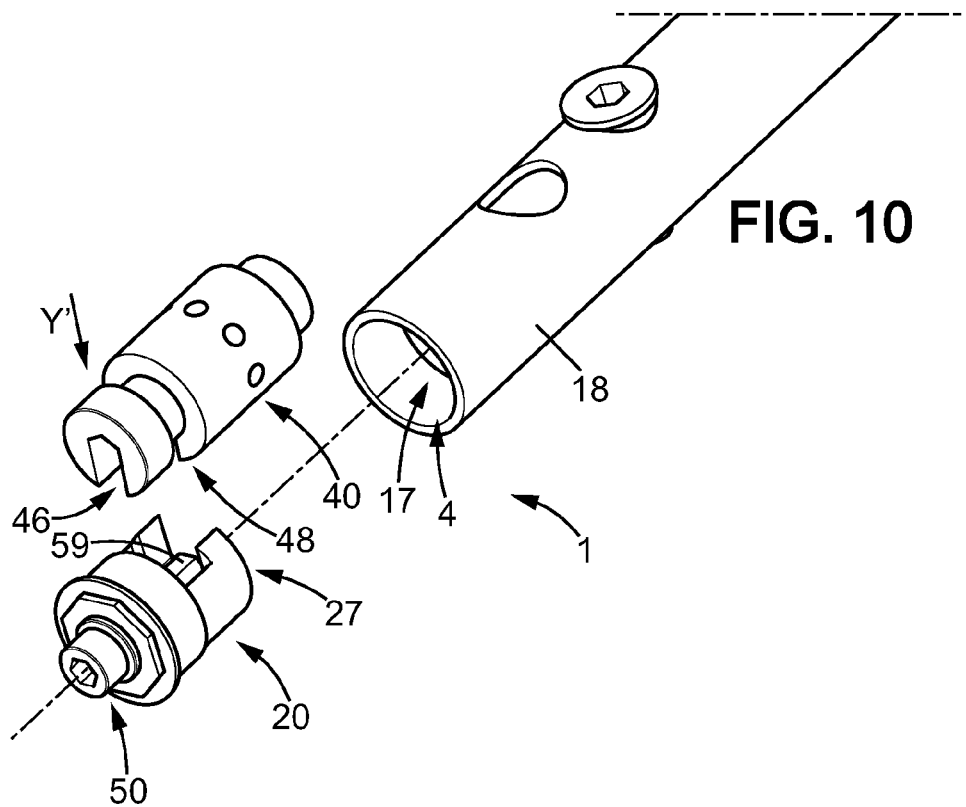
FIG. 10 shows in perspective the device according to the second embodiment during assembling.

And the guide member 40 has a slot 46 extending between the internal surface 45a and the external surface 45b of the tubular portion 45 in order to insert the cylindrical pin 59 of the screw 50 in the cylindrical bore 49 of the guide member 40 along an insertion direction Y' perpendicular to the longitudinal axis X, as shown in FIG. 10.

Figure 9:
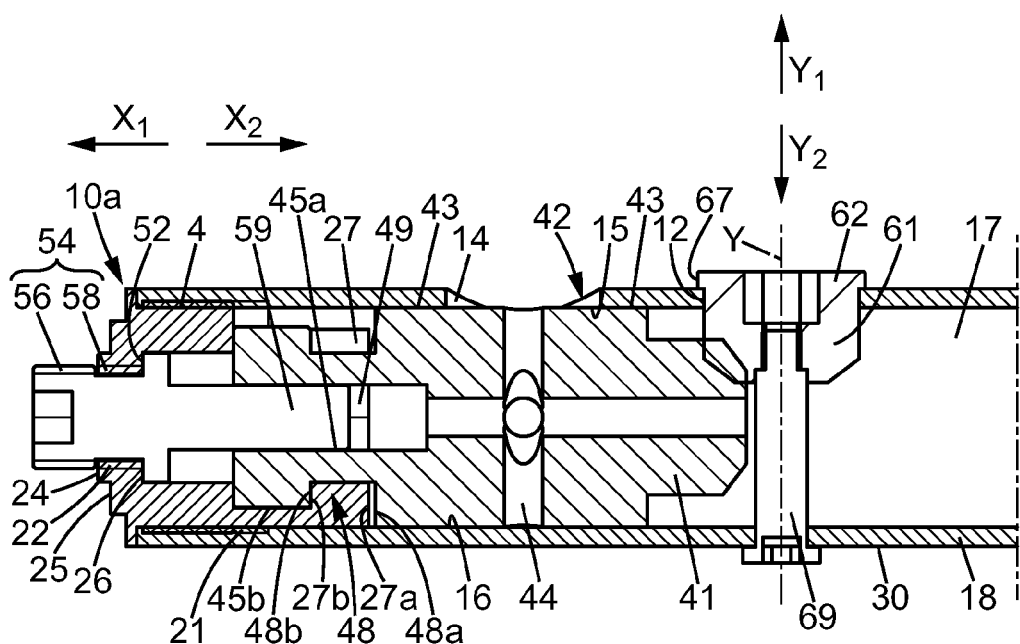
FIG. 9 is a section view on line referenced IX-IX in FIG. 7.

Moreover, optionally, the guide member 40 comprises an annular gripping portion 42 and the support 10 comprises two apertures 14 facing the gripping portion 42, in order to enable a user to directly rotate the guide member 40 with his finger contacting the gripping portion 42. The gripping portion 42 is disposed between two annular external surfaces 43. As shown in FIG. 9, the aperture 14 is surrounded by a peripheral edge 15 which is flush with the gripping portion 42. The gripping portion 42 further comprises driving holes 44 extending radially to the longitudinal axis X, in order to enable insertion of a stem in the driving holes 44 to directly drives the guide member 40 and exerts a high torque around the longitudinal axis X.

Except the guide member retaining portion 27, the insert 20 has symmetry of revolution. So, the body 23 of the insert 20 is threaded near the plate 28, the cylindrical surface 16 is threaded next to the opening 14, and the insert 20 is fastened to the housing 18 by screwing 21.

In order to manufacture the construction element 1 of the second embodiment, the drive shaft 60 is inserted in the housing 18 through the side hole 12 and the retaining screw 69 is screwed in the drive shaft 60 to maintain the drive shaft 60 along the cross axis Y. The screw 50 is screwed in the threaded hole 22 of the insert 20. Then, the guide member 40 is moved along the insertion direction Y' with respect to the screw 50 and the insert 20, so that the pin 59 of the screw 50 is inserted in the bore 49 of the guide member 40 through the slot 46. Then, the insert 20 supporting the screw 50 and the drive shaft 40 is inserted into the cavity 17 through the opening 4, and screwed 21 to the housing 18, the annular external surface 43 of the guide member 40 bearing against the cylindrical surface 16 of the housing 18.

And the guide member 40 has a slot 46 extending between the internal surface 45a and the external surface 45b of the tubular portion 45 in order to insert the cylindrical pin 59 of the screw 50 in the cylindrical bore 49 of the guide member 40 along an insertion direction Y' perpendicular to the longitudinal axis X, as shown in FIG. 10.

FIG. 7 shows an other embodiment of joining element 101. The joining element 101 shown in FIG. 7 is generally a sphere having twenty six threaded fixing holes 122 orthogonally distributed.

It should be noticed that in the embodiment shown in FIGS. 7 to 10, the peripheral external surface 30 is circular, but it can be identical to the peripheral external surface of the embodiment shown in FIGS. 1 to 6, since the shape of the cylindrical surface 16 and the shape of the peripheral external surface 30 can be modified independently one from the other. Moreover, the joining element 101 shown in FIGS. 1 to 6, and the joining element 101 shown in FIGS. 7 to 10 can be fastened either to the construction element shown in FIGS. 1 to 6, or to the construction element shown in FIGS. 7 to 10.

FIGS. 11 and 12 show a third embodiment of construction element 1 in accordance with the invention.

The third embodiment mainly differs from the first embodiment in that the drive shaft 60 is no more prevented from translating along the cross axis Y in the first direction Y1 and is part of a driving tool 80.

When the drive shaft 60 is operating, as shown in FIG. 11, the side hole 12 forms a bearing surface against which rotates the peripheral portion 64 of the drive shaft 60, the external surface 63 is received within the bearing surface 13 and the conical gear 61 of the drive shaft 60 engages the conical gear 41 of the guide member 40. Therefore, the side hole 12 and the bearing surface 13 of the support 10 guide the drive shaft 60 along the cross axis Y, so that the conical gear 61 of the drive shaft 60 is well positioned to cooperate with the conical gear 41 of the guide member 40.

When the drive shaft 60 is removed from the housing 18, preferably the side hole 12 is closed by a cap 82.

Figure 14:
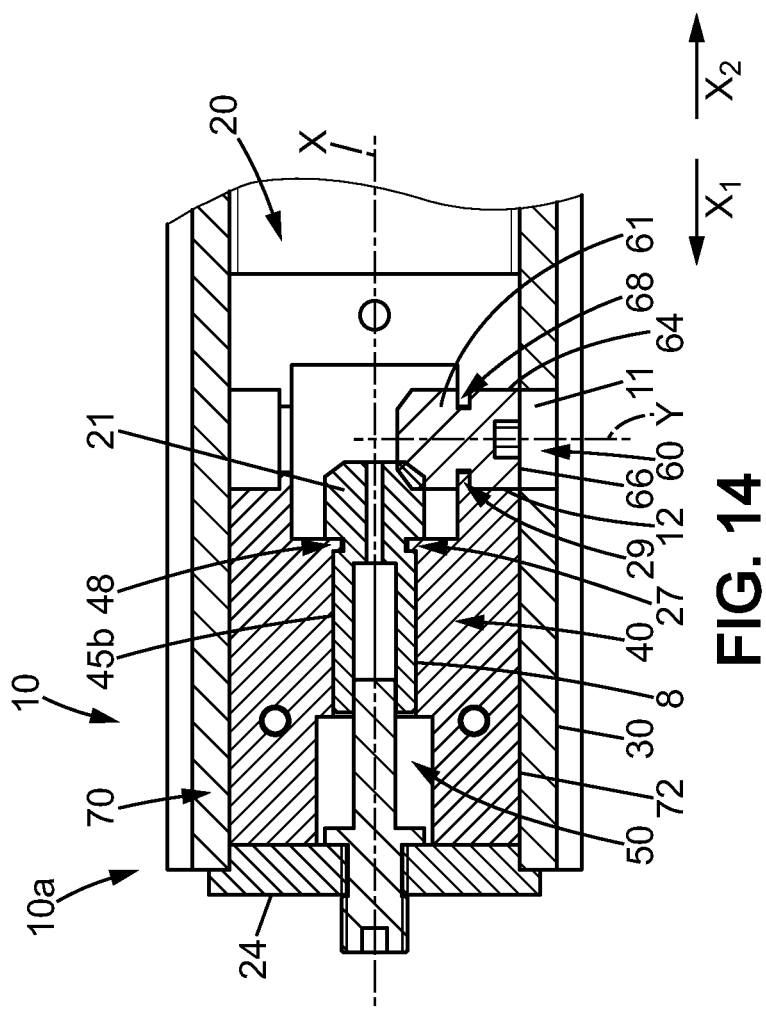
FIG. 14 is a cross section view on line referenced XIV-XIV in FIG. 13.

FIGS. 13 and 14 show a fourth embodiment of construction element 1 in accordance with the invention.

The fourth embodiment mainly differs from the first embodiment in the insert 20 defines a casing having two parts 20a, 20b (the body 23 divided in two along 23 a plan of symmetry extending along the longitudinal axis X and the cross axis Y) fixed together and between which are retained the screw 50 and the drive shaft 60. Furthermore, the insert 20 comprises the side hole 12 forming bearing surface 13 against which rotates the peripheral portion 64 of the head 62 of the drive shaft 60, so that the insert 20, the screw 50 and the drive shaft 60 are part of a module 70.

In the fourth embodiment the guide member retaining portion 27 of the insert 20 is an annular ledge inserted in an annular groove 48 of the guide member 40, so that the guide member retaining portion 27 prevents the guide member 40 from sliding along the longitudinal axis X in the first direction X1 and in the second direction X2 with respect to the insert 20.

Therefore, the guide member 40 is directly supported by the insert 20 and can only rotate around the longitudinal axis X with respect to the insert 20.

Moreover, the drive shaft retaining portion 29 of the insert 20 is an annular ledge inserted in the annular groove 68 of the drive shaft 60, so that the drive shaft retaining portion 29 prevents the drive shaft from sliding along the cross axis X in the first direction Y1 and in the second direction Y2 with respect to the insert 20.

And, since the side hole 12 bears the peripheral portion 64 of the head 62 of the drive shaft 60, the drive shaft 60 is directly supported by the insert 20 and can only rotate around the cross axis Y with respect to the insert 20.

The self supporting module 70 comprising the insert 20, the screw 50, the guide member 40 and the drive shaft 60 is inserted in the cavity 17 of the housing 18 and fixed to the housing by screws 21.

Otherwise, the end surface 66 of the drive shaft 60 is flush with a peripheral surface 72 of the body 23 of the insert 20 and the housing 18 has a passage 11 which extends along the cross axis Y, runs on from the side hole 12 and has the same cross section as the side hole 12.

Figure 15:
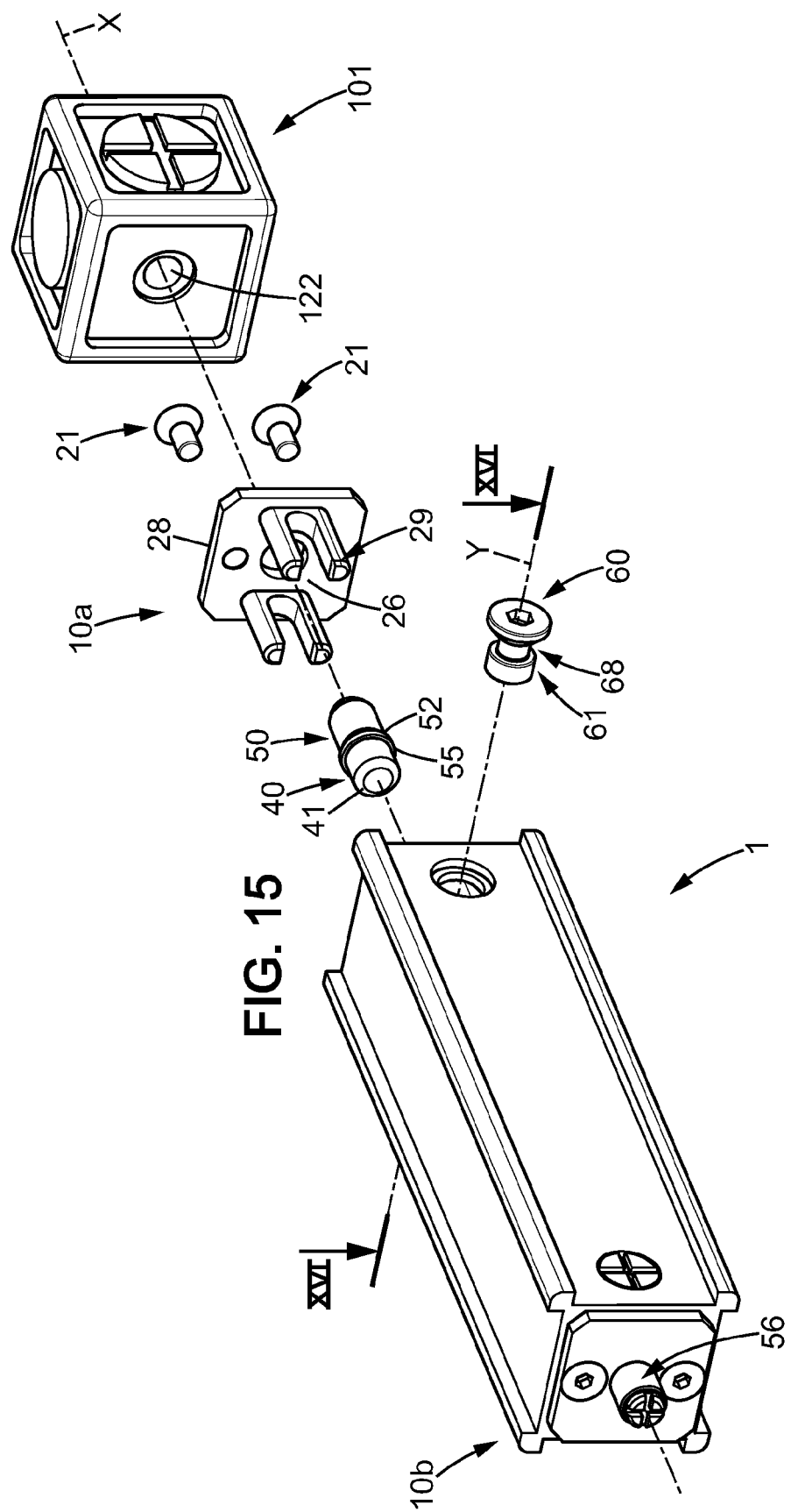
FIG. 15 shows in exploded perspective a device according to a fifth embodiment.
Figure 16:
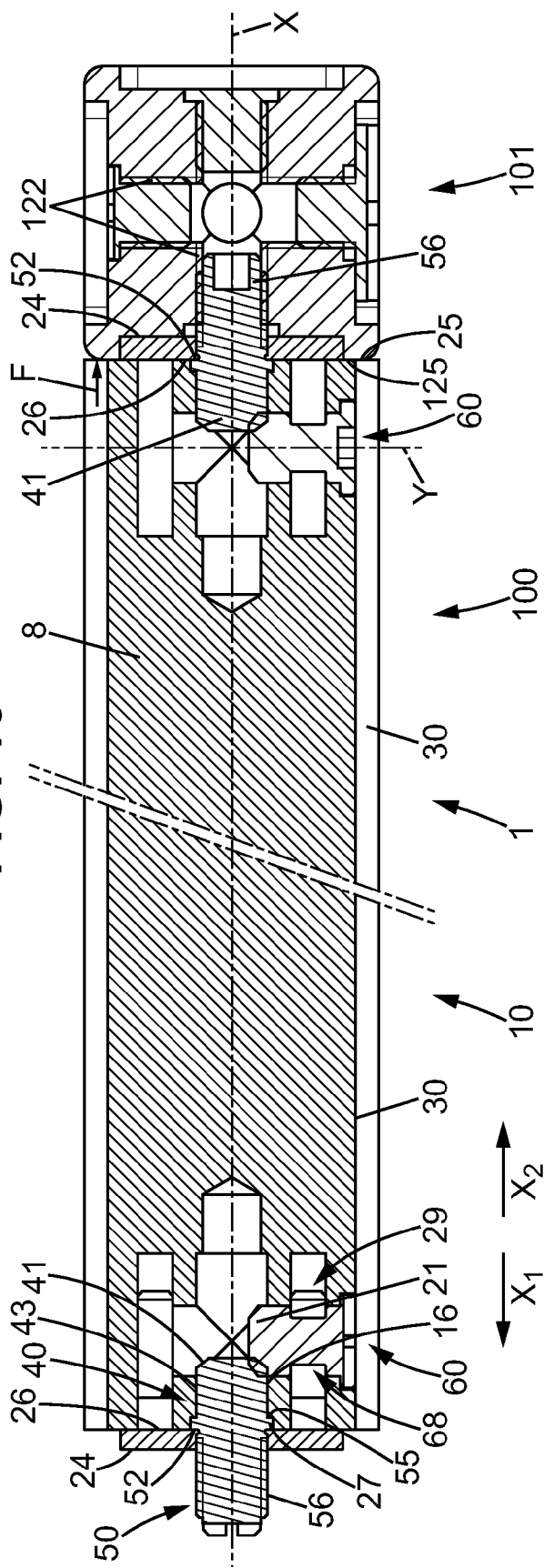
FIG. 16 is a cross section view on line referenced XVI-XVI in FIG. 15.

FIGS. 15 and 16 show a fifth embodiment of construction element 1 in accordance with the invention.

The fifth embodiment differs from the first embodiment in that the guide member 40 is integral with the screw 50 (preferably cast in one piece with the screw 50).

The abutting surface 52 of the screw 50 abuts against the internal abutting surface 26 of the insert 20 in order to prevent the screw 50 from translating along the longitudinal axis X in the first direction X1.

The guide member retaining portion 27 is part of the housing 18 and abuts against the retaining flange 55 of the guide member 40 in order prevent the screw 50 from translating along the longitudinal axis X in the second direction X2. Therefore, the screw 50 can only rotate around the longitudinal axis with respect to the support 10.

Figure 17:
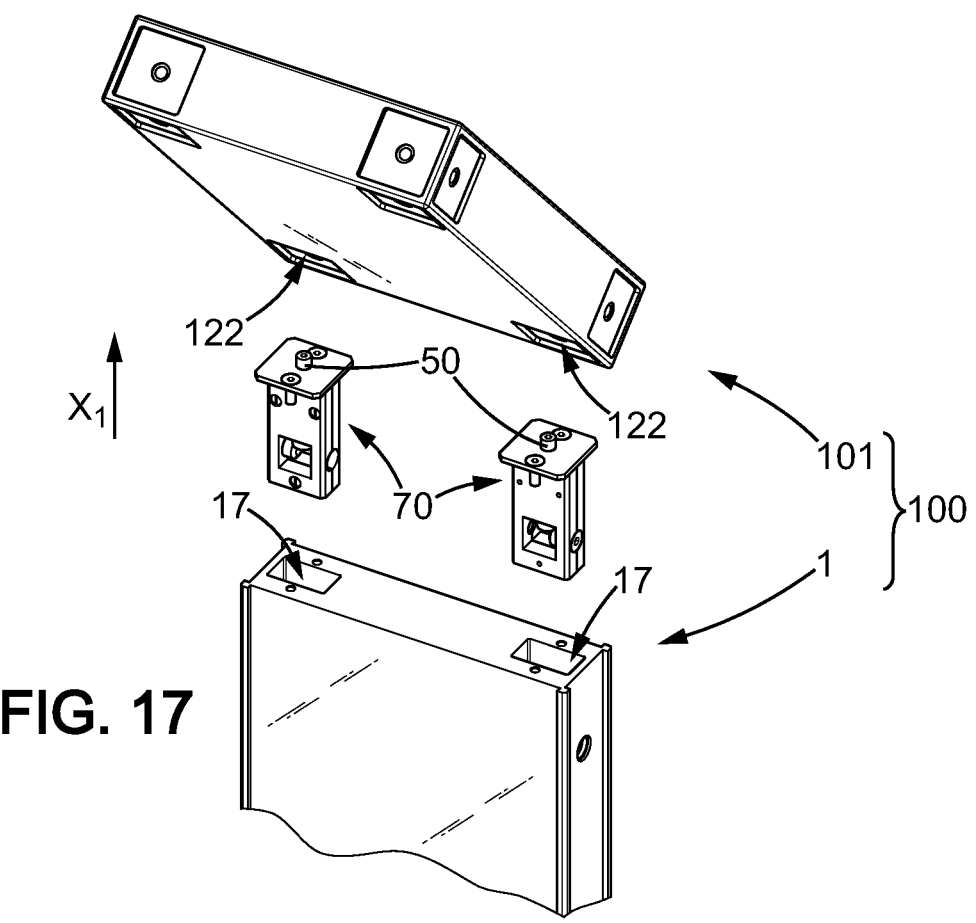
FIG. 17 shows in perspective, partially exploded, a device according to a sixth embodiment.

FIG. 17 shows a sixth embodiment of device 100 in accordance with the invention.

The sixth embodiment mainly differs from the fourth embodiment in that the construction element 1 is a plate and the joining element 101 is a plate to be releasably fastened to the construction element 1.

The construction element 1 comprises two cavities 17. The module 70 is inserted in each cavity 17 and the screws 50 of the modules 70 are able to protrude in the same direction, so that the screws 50 are to be fastened to two respective threaded hole 122 of the same joining element 101.

Figure 18:
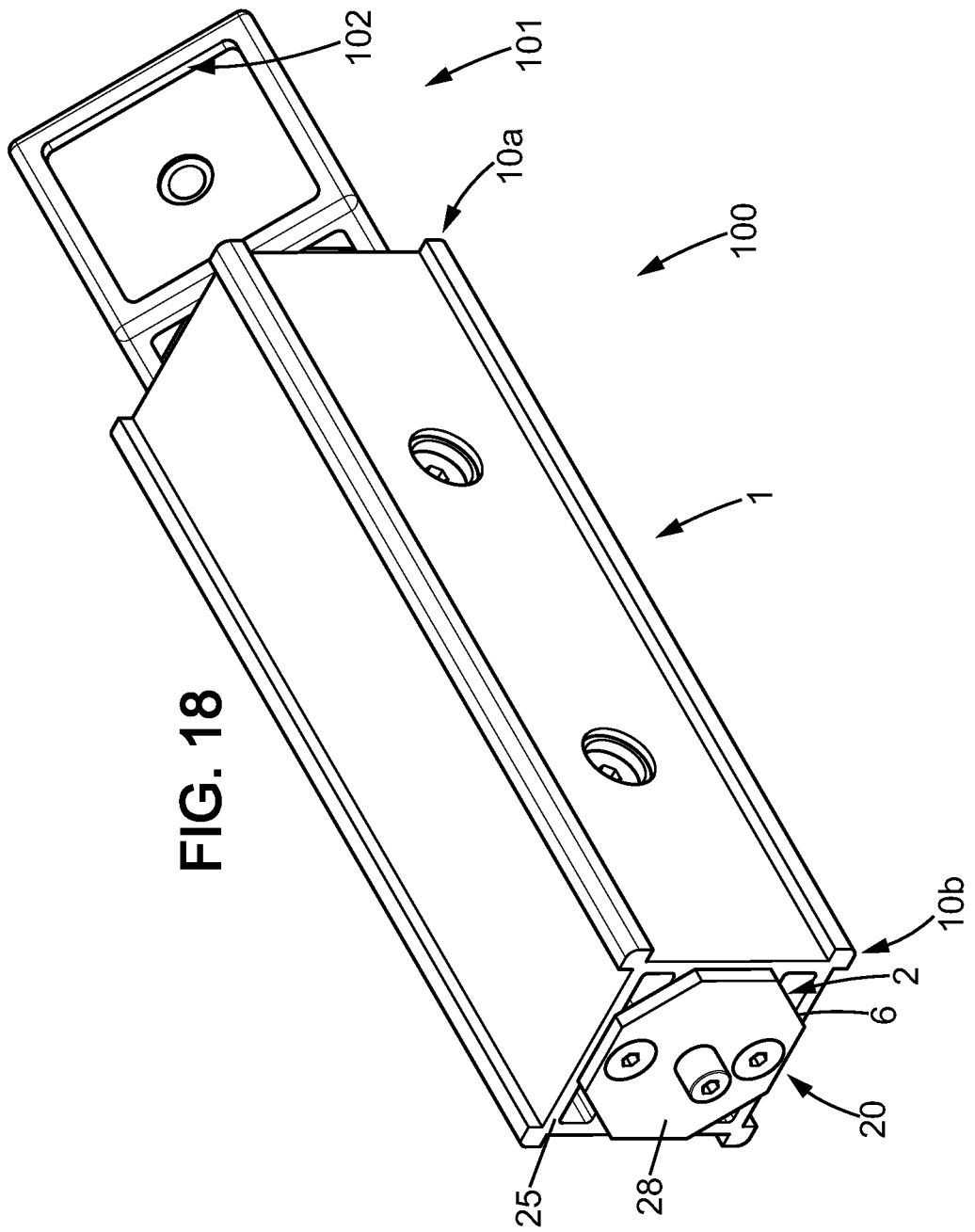
FIG. 18 shows in perspective, partially exploded, a device according to a seventh embodiment.

FIG. 18 shows a seventh embodiment of device 100 in accordance with the invention.

In the seventh embodiment, the plate 28 has a peripheral surface 6 having a cross section perpendicular to the longitudinal axis X which is substantially octagonal. The construction element 1 has at each end 10a, 10b a protruding crank 2 having an octagonal section perpendicular to the longitudinal axis X.

Therefore, the construction element 1 is indexed in one of eight angular relative positions evenly disposed (every 45 degrees) with respect to the joining element 101 around the longitudinal axis X.

The invention claimed is:

1. A construction assembly for spatial structure intended to be releasably fastened to an element, said construction assembly comprising:
   a screw having a shank and an abutting flange, said shank extending along a longitudinal axis and including a threaded portion,
   a support having a peripheral surface extending in the direction of the longitudinal axis and an end along the longitudinal axis, said support comprising a first hole and a second hole, the first hole extending through said peripheral surface and the second hole receiving the shank of the screw,
   a drive shaft rotatably mounted with respect to the support along a cross axis, said cross axis being not parallel to the longitudinal axis and extending through the first hole of the support, rotation of the drive shaft around the cross axis being mechanically linked to rotation of the screw around the longitudinal axis, a guide member rotatably mounted around the longitudinal axis with respect to the support, rotation of the drive shaft around the cross axis is mechanically linked to rotation of the screw around the longitudinal axis through the guide member, the screw is free to slide along the longitudinal axis with respect to the guide member, the screw is movable along the longitudinal axis with respect to the support, and the guide member has an abutting flange, and wherein the support comprises a housing and an insert, said housing has a cavity comprising an opening at an end of the support along the longitudinal axis, the insert is inserted in the cavity and removably fixed to the housing, and wherein the insert includes one part at least a portion of which extends through said opening of the housing and said one part comprising:

a plate comprising the whole second hole, the plate extending outside the housing and having a radially extending portion fixed to the housing at said end of the support along the longitudinal axis, an abutting surface cooperating with the abutting flange of the screw, a guide member retaining portion abutting the abutting flange of the guide member to prevent the guide member from translating along the longitudinal axis in one direction.

2. The construction assembly according to claim 1, wherein the drive shaft can only rotate around the cross axis with respect to the support.

3. The construction assembly according to claim 2 wherein:

the drive shaft includes a head portion having a circular peripheral section around the cross axis, said first hole has a circular section, said first hole is closed by the head portion of the drive shaft.

4. The construction assembly according to claim 3 wherein said head portion has an end surface along the cross axis and said end surface of the drive shaft is flush with the peripheral surface of the support.

5. The construction assembly according to claim 1 wherein:

the screw comprises a cylindrical pin of non-circular section, the guide member comprises a cylindrical bore receiving the cylindrical pin of the screw, and the cylindrical bore of the guide member engages the cylindrical pin of the screw to secure the guide member and the screw one to the other in rotation around the longitudinal axis.

6. The construction assembly according to claim 5, wherein:

the guide member includes a tubular portion having an internal surface defined by the cylindrical bore and an external surface, and the guide member has a slot extending between the internal surface and the external surface in order to insert the cylindrical pin of the screw in the cylindrical bore of the guide member along an insertion direction perpendicular to the longitudinal axis.

7. The construction assembly according to claim 1 wherein the drive shaft is coupled to the screw through bevel gearing and the guide member is prevented from translating along the longitudinal axis in one direction by the drive shaft and the drive shaft is prevented from translating along the cross axis in one direction by the guide member.

8. The construction assembly according to claim 1 wherein:

the guide member has an annular groove including the abutting flange thereof, and the guide member retaining portion is engaged in the annular groove of the guide member to prevent the guide member from translating along the longitudinal axis in two opposite directions.

9. The construction assembly according to claim 1 wherein:

the drive shaft has an abutting flange, and the insert further comprises a drive shaft retaining portion abutting the abutting flange of the drive shaft to prevent the drive shaft from translating along the cross axis in one direction.

10. The construction assembly according to claim 1 wherein:

the drive shaft has an annular groove, and the insert further comprises a drive shaft retaining portion engaged in the annular groove of the drive shaft to prevent the drive shaft from translating along the cross axis in two opposite directions.

11. The construction assembly according to claim 1 wherein the insert defines a casing in which are retained the screw, the guide member and the drive shaft, so that the insert, the screw, the guide member and the drive shaft are part of a module.

12. The construction assembly according to claim 11 wherein:

the insert comprises a body divided in two parts along a plan of symmetry extending along the longitudinal axis and the cross axis fixed together, and the screw, the guide member and the drive shaft are retained between said two parts.

13. The construction assembly according to claim 1 wherein the housing is extruded.

14. The construction assembly according to claim 1 wherein the drive shaft is coupled to the screw through bevel gearing.

15. The construction assembly according to claim 1 wherein the cross axis is perpendicular to the longitudinal axis.

16. The construction assembly according to claim 1 wherein:

the support further has a front surface and an abutting surface, and the second hole is threaded, the screw is movable with respect to the support in coupled translation and rotation between a retracted position and a protruding position, the threaded portion of the screw engaging the threaded second hole between the retracted position and the protruding position, and the threaded portion of the screw protruding from the front surface of the support in the protruding position, and in a fixing position, the threaded portion of the screw protrudes from the front surface of the support, the abutting flange of the screw abuts against the abutting surface of the support, and the screw is able to rotate with respect to the support around the longitudinal axis without translating along the longitudinal axis.

17. A device comprising a construction assembly according to claim 1 and an element comprising a threaded fixing hole, wherein:

the construction assembly comprises an internal abutting surface and an external abutting surface, the second hole extends through the internal abutting surface, the screw is screwed in the fixing hole of the element, the abutting flange of the screw abuts against the internal abutting surface of the support, and the external abutting surface of the construction assembly exerts a pressure along the longitudinal axis against an abutting surface of the element increasing with the screwing of the screw in the fixing hole, the radially extending portion comprises a crank having a non circular cross section perpendicular to the longitudinal axis, and the element comprises a crank opposite and complementary to the crank of the construction assembly, so that the construction assembly and the element fit into each other, one of the crank of the construction assembly and the crank of the element has a polygonal cross section perpendicular to the longitudinal axis and the other one of the crank of the construction assembly and the crank of the element has a regular octagonal cross section perpendicular to the longitudinal axis.

18. The device according to claim 17 wherein:

one of the crank of the construction assembly and the crank of the element has a regular octagonal cross section perpendicular to the longitudinal axis, the other of the crank of the construction assembly and the crank of the element has a square cross section perpendicular to the longitudinal axis, and the crank having a regular octagonal cross section is inserted in the crank having a square cross section.

19. A construction assembly for spatial structure intended to be releasably fastened to an element, said construction assembly comprising:

a screw having a shank and an abutting flange, said shank extending along a longitudinal axis and including a threaded portion, a support having a peripheral surface extending in the direction of the longitudinal axis and an end along the longitudinal axis, said support comprising a first hole and a second hole, the first hole extending through said peripheral surface and the second hole receiving the shank of the screw, a drive shaft rotatably mounted with respect to the support along a cross axis, said cross axis being not parallel to the longitudinal axis and extending through the first hole of the support, rotation of the drive shaft around the cross axis being mechanically linked to rotation of the screw around the longitudinal axis, a guide member rotatably mounted around the longitudinal axis with respect to the support, rotation of the drive shaft around the cross axis is mechanically linked to rotation of the screw around the longitudinal axis through the guide member, the screw is free to slide along the longitudinal axis with respect to the guide member, the screw is movable along the longitudinal axis with respect to the support, and the guide member has an abutting flange, and wherein:

the support comprises a housing and an insert, said housing has a cavity comprising an opening at an end of the support along the longitudinal axis, the insert defines a casing in which are retained the screw, the guide member and the drive shaft, so that the insert, the screw, the guide member and the drive shaft are part of a module which is inserted in the cavity and removably fixed to the housing, and wherein the insert includes one part extending through said opening of the housing and said one part comprising:

a plate comprising the whole second hole, the plate extending outside the housing and having a radially extending portion fixed to the housing at said end of the support along the longitudinal axis, an abutting surface cooperating with the abutting flange of the screw, a guide member retaining portion abutting the abutting flange of the guide member to prevent the guide member from translating along the longitudinal axis in one direction.

20. A construction assembly for spatial structure intended to be releasably fastened to an element, said construction assembly comprising:

a screw having a shank and an abutting flange, said shank extending along a longitudinal axis and including a threaded portion, a support having a peripheral surface extending in the direction of the longitudinal axis and an end along the longitudinal axis, said support comprising a first hole and a second hole, the first hole extending through said peripheral surface and the second hole receiving the shank of the screw, a drive shaft rotatably mounted with respect to the support along a cross axis, said cross axis being not parallel to the longitudinal axis and extending through the first hole of the support, rotation of the drive shaft around the cross axis being mechanically linked to rotation of the screw around the longitudinal axis, a guide member rotatably mounted around the longitudinal axis with respect to the support, rotation of the drive shaft around the cross axis is mechanically linked to rotation of the screw around the longitudinal axis through the guide member, the screw is free to slide along the longitudinal axis with respect to the guide member, the screw is movable along the longitudinal axis with respect to the support, and the guide member has an abutting flange, and wherein:

the support comprises a housing and an insert, said housing has a cavity comprising an opening at an end of the support along the longitudinal axis, the insert defines a casing divided in two parts along a plan of symmetry extending along the longitudinal axis and the cross axis fixed together, the screw, the guide member and the drive shaft are retained between said two parts, the insert, the screw, the guide member and the drive shaft are part of a module which is inserted in the cavity and removably fixed to the housing, and wherein the insert includes one part extending through said opening of the housing and said one part comprising:

a plate comprising the second hole the plate extending outside the housing and having a radially extending portion fixed to the housing at said end of the support along the longitudinal axis, an abutting surface cooperating with the abutting flange of the screw, a guide member retaining portion abutting the abutting flange of the guide member to prevent the guide member from translating along the longitudinal axis in one direction.

\* \* \* \* \*